United States Patent
Palmerton et al.

(10) Patent No.: US 7,761,188 B2
(45) Date of Patent: Jul. 20, 2010

(54) FLUID EVACUATION SYSTEM WITH TWO-WAY COMMUNICATION FILTER

(75) Inventors: Christopher A. Palmerton, Clarence, NY (US); Daniel Palmerton, Amherst, NY (US); Robert O. Dean, Tonawanda, NY (US); Jay T. Kajdas, Getzville, NY (US); Earnest Moehlau, Amherst, NY (US)

(73) Assignee: Medtek Devices, Inc., Buffalo, NY (US)

( * ) Notice: Subject to any disclaimer, the term of this patent is extended or adjusted under 35 U.S.C. 154(b) by 1018 days.

(21) Appl. No.: 11/398,285

(22) Filed: Apr. 4, 2006

(65) Prior Publication Data

US 2006/0265149 A1  Nov. 23, 2006

Related U.S. Application Data

(60) Provisional application No. 60/668,126, filed on Apr. 4, 2005.

(51) Int. Cl.
*G06F 17/00* (2006.01)
(52) U.S. Cl. .................. 700/282; 702/45; 210/91; 235/385; 73/37
(58) Field of Classification Search .......... 700/282; 702/45; 210/91; 235/385; 73/37, 38; 55/385.1, 55/385.2
See application file for complete search history.

(56) References Cited

U.S. PATENT DOCUMENTS

| | | | |
|---|---|---|---|
| 3,825,004 A | 7/1974 | Durden, III | 128/275.1 |
| 3,828,780 A | 8/1974 | Morrison, Jr. | 128/275.1 |
| 3,974,833 A | 8/1976 | Durden, III | 128/275.1 |
| 4,562,838 A | 1/1986 | Walker | 128/303.14 |
| 4,735,603 A | 4/1988 | Goodson et al. | 604/21 |
| 5,085,657 A | 2/1992 | Ben-Simbon | 606/42 |
| 5,133,714 A | 7/1992 | Beane | 606/49 |

(Continued)

FOREIGN PATENT DOCUMENTS

EP    0996105 A    4/2000

(Continued)

OTHER PUBLICATIONS

Translation of Brunnengraber et al., Method for Identifying Modules or Modular Units and System for Identifying and/or Diagnosing a Module or a Modular Unit Comprising a Plurality of Individual Components, WO 03/017015 A1, Published Feb. 27, 2003, WIPO (Foreign Patent Document Cite No. 1 above).

(Continued)

*Primary Examiner*—Albert DeCady
*Assistant Examiner*—Douglas S Lee
(74) *Attorney, Agent, or Firm*—Phillips Lytle LLP

(57) ABSTRACT

An evacuation system includes at least one fluid intake, at least one fluid outlet, at least one operational component, such as an evacuation motor, and a first read/write device for transmitting, receiving, or storing information. The evacuation system also includes a filter having a second read/write device for transmitting information to the first read/write device. A microcontroller, which is in functional communication with the first read/write device and the operational component, interprets the information received by said first read/write device and controls the operational component based on said interpreted information.

12 Claims, 16 Drawing Sheets

U.S. PATENT DOCUMENTS

| | | | |
|---|---|---|---|
| 5,192,424 A | 3/1993 | Beyne et al. | |
| 5,217,457 A | 6/1993 | Delahuerga et al. | 606/42 |
| 5,354,979 A | 10/1994 | Adelson et al. | |
| 5,451,222 A | 9/1995 | De Maagd et al. | 606/41 |
| 5,451,223 A | 9/1995 | Ben-Simbon | 606/42 |
| D384,148 S | 9/1997 | Monson | D24/112 |
| 5,674,219 A | 10/1997 | Monson et al. | 606/45 |
| 5,674,381 A | 10/1997 | Den Dekker | |
| 5,836,944 A | 11/1998 | Cosmescu | 606/41 |
| 6,045,596 A * | 4/2000 | Holland et al. | 55/385.2 |
| D426,833 S | 6/2000 | Vanelli | D14/387 |
| 6,142,995 A | 11/2000 | Cosmescu | 606/41 |
| 6,146,353 A | 11/2000 | Platt, Jr. | 604/22 |
| 6,524,307 B1 | 2/2003 | Palmerton et al. | 606/41 |
| 6,558,444 B1 * | 5/2003 | Hunter | 55/385.1 |
| 6,636,151 B2 | 10/2003 | Busick | |
| 6,879,876 B2 * | 4/2005 | O'Dougherty et al. | 700/231 |
| RE39,361 E | 10/2006 | Den Dekker | |
| 2002/0189667 A1 | 12/2002 | O'Dougherty et al. | 137/1 |
| 2005/0059926 A1* | 3/2005 | Sage et al. | 604/65 |
| 2005/0194317 A1 | 9/2005 | Ikeyama et al. | 210/625 |
| 2005/0209547 A1 | 9/2005 | Burbank et al. | 604/5.01 |
| 2005/0224577 A1* | 10/2005 | Rozenblat et al. | 235/385 |
| 2006/0060512 A1* | 3/2006 | Astle et al. | 210/85 |
| 2007/0240492 A1* | 10/2007 | DiLeo et al. | 73/38 |

FOREIGN PATENT DOCUMENTS

| | | |
|---|---|---|
| EP | 1339014 A | 8/2003 |
| JP | 2004342510 A | 12/2004 |
| WO | 03017015 A1 | 2/2003 |
| WO | WO 2005/028078 A3 | 3/2005 |
| WO | 2005089402 A | 9/2005 |
| WO | 2005098558 A | 10/2005 |

OTHER PUBLICATIONS

The International Bureau of WIPO, International Preliminary Report on Patentability, PCT/US2006/012517, Oct. 9, 2007.

ISA/EPO, International Search Report, PCT/US2006/012517, Apr. 8, 2006.

ISA/EPO, Written Opinion of the International Searching Authority, PCT/US2006/012517, Apr. 8, 2006.

European Patent Office, Office Action, Application No. 06 749 261.1, Mar. 3, 2008.

European Patent Office, Office Action, Application No. 06 749 261.1, Mar. 17, 2009.

Patent Abstracts of Japan, vol. 2003, No. 12, Dec. 5, 2003.

* cited by examiner

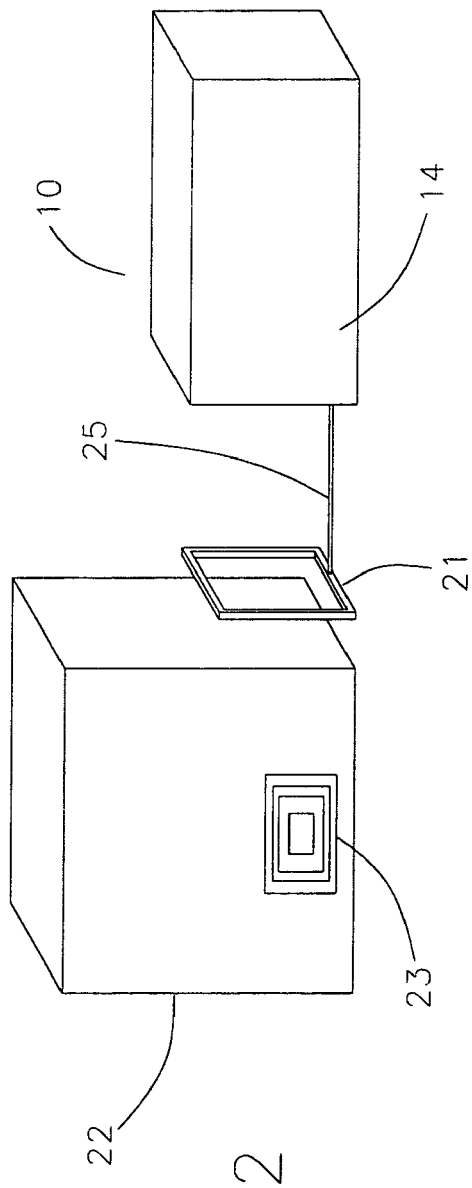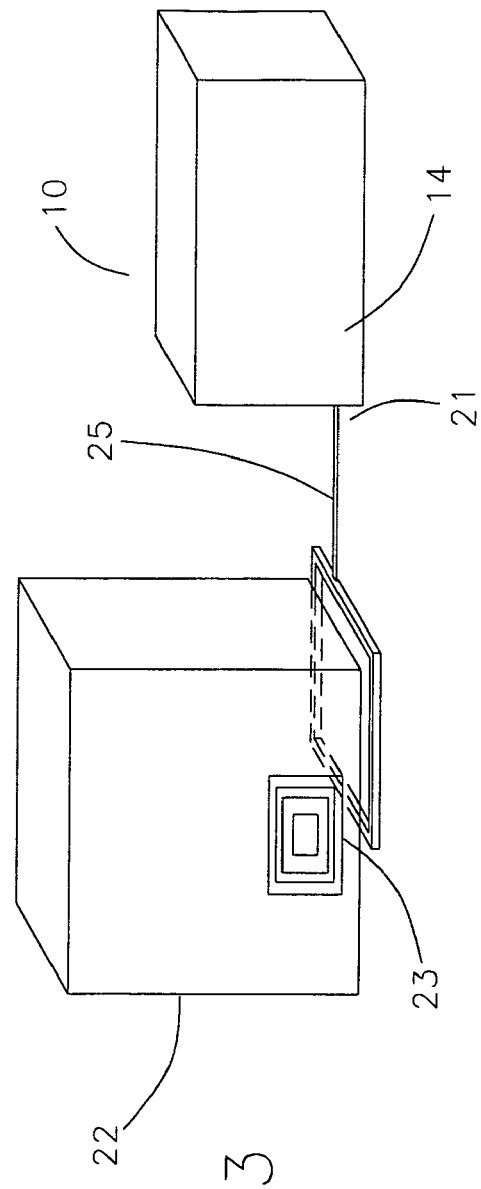

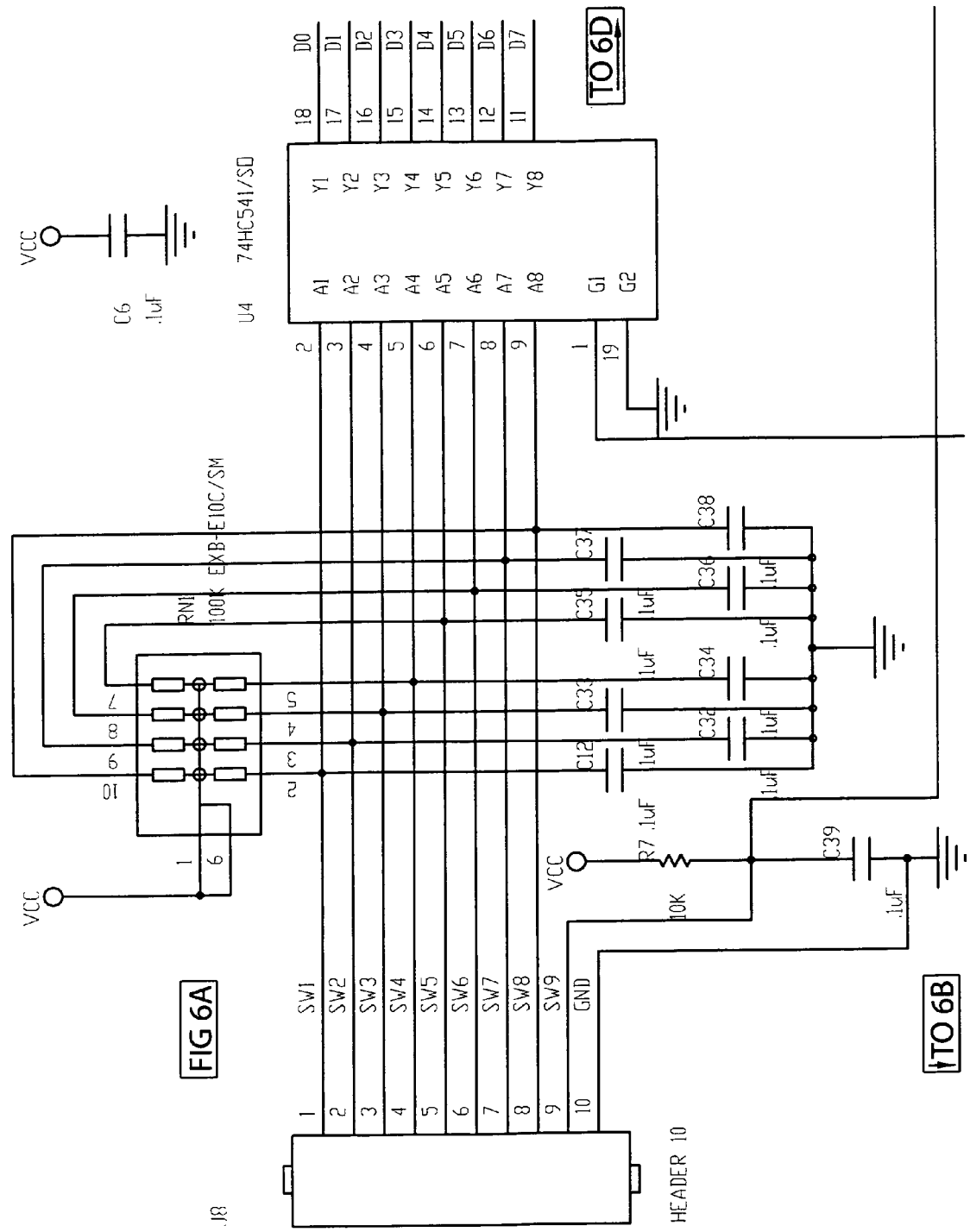

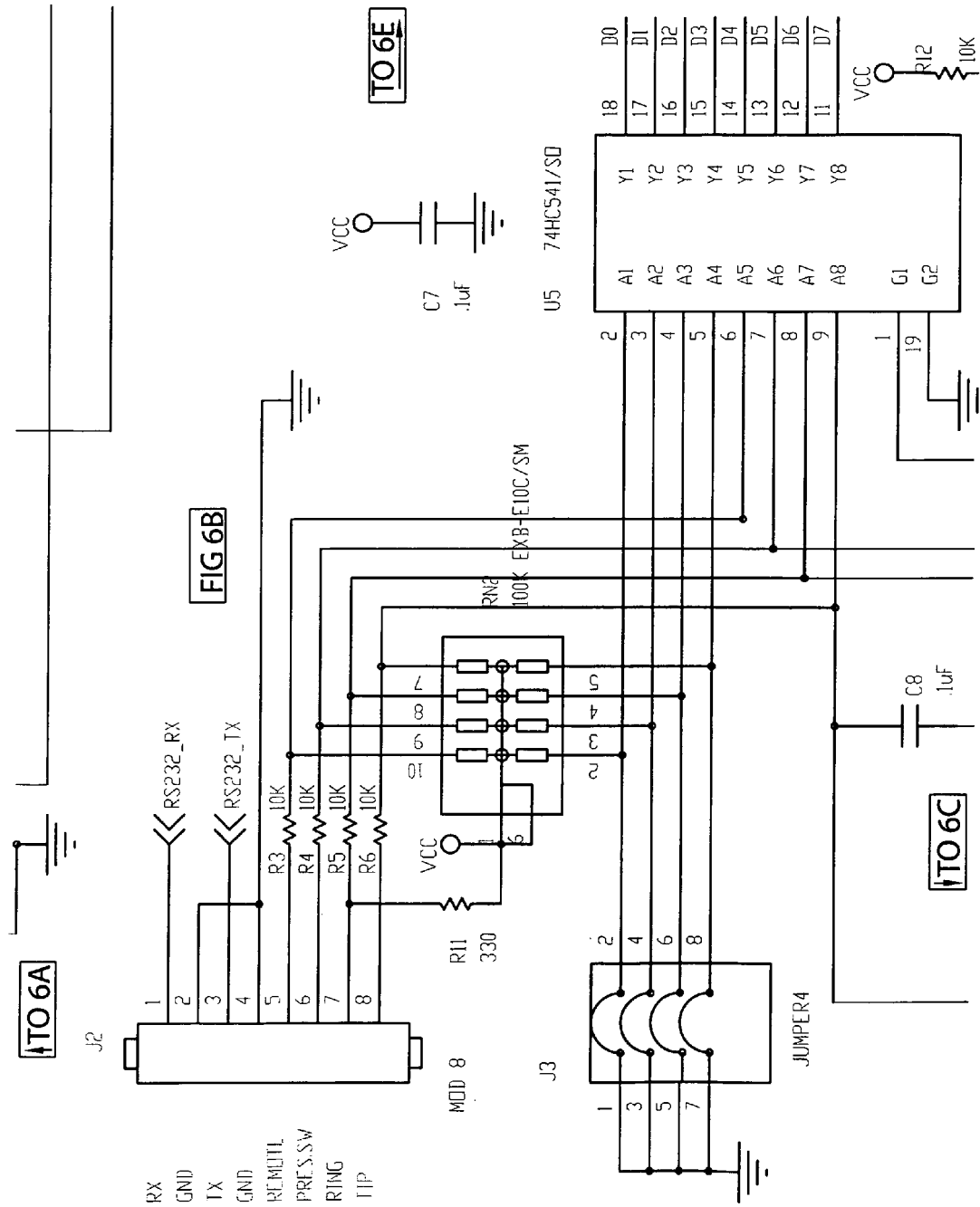

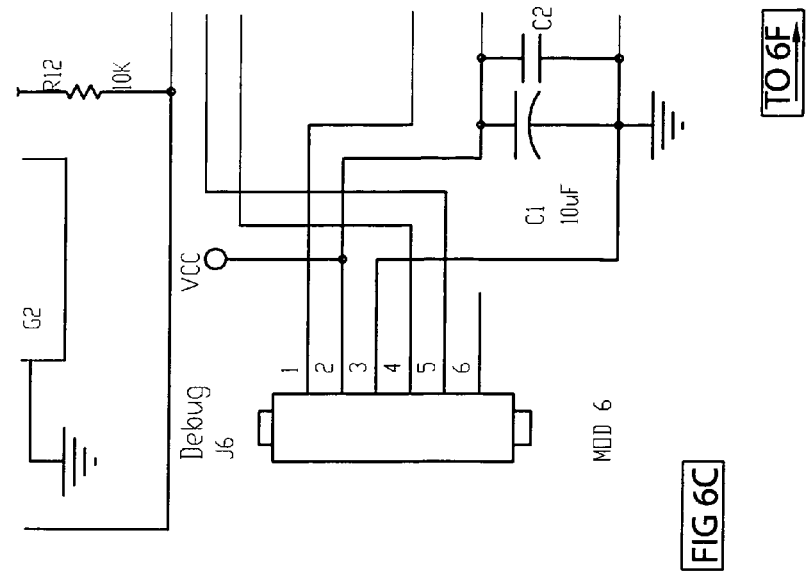
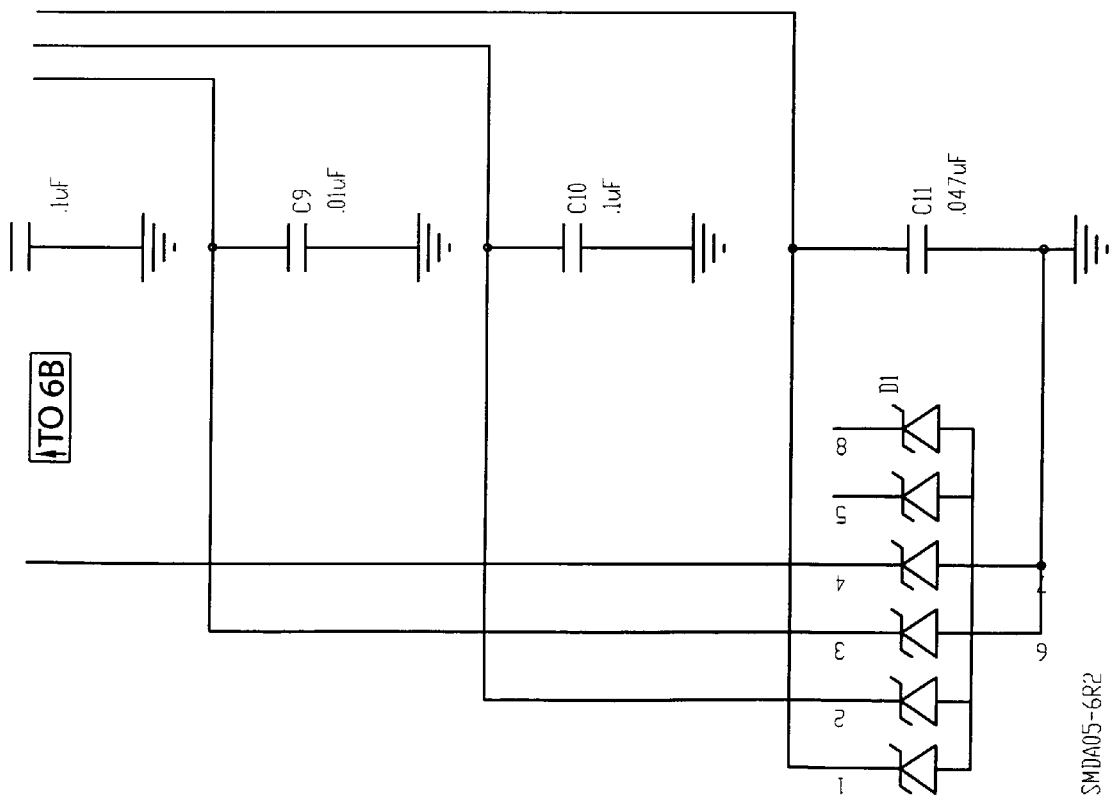
FIG 6C

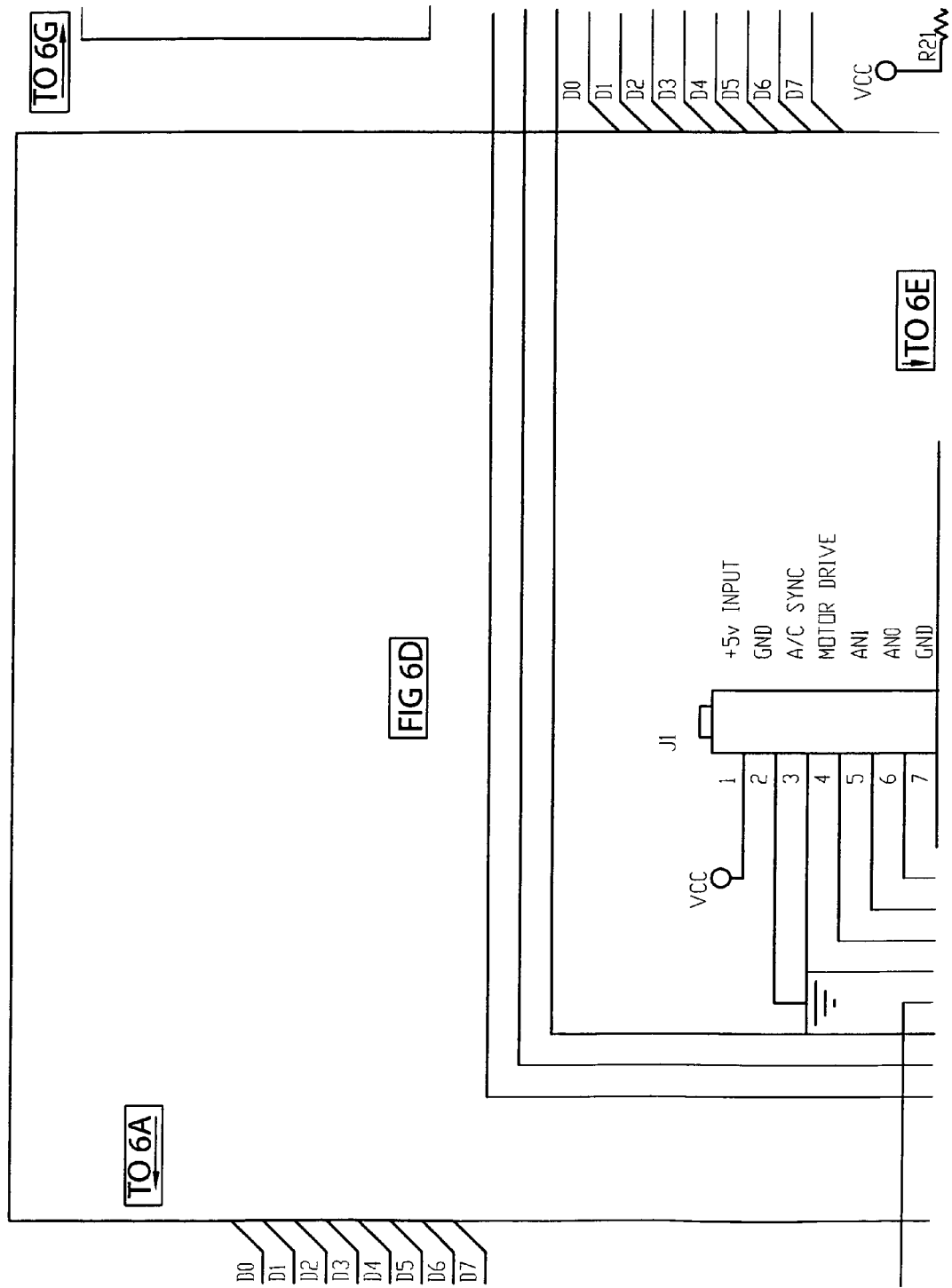

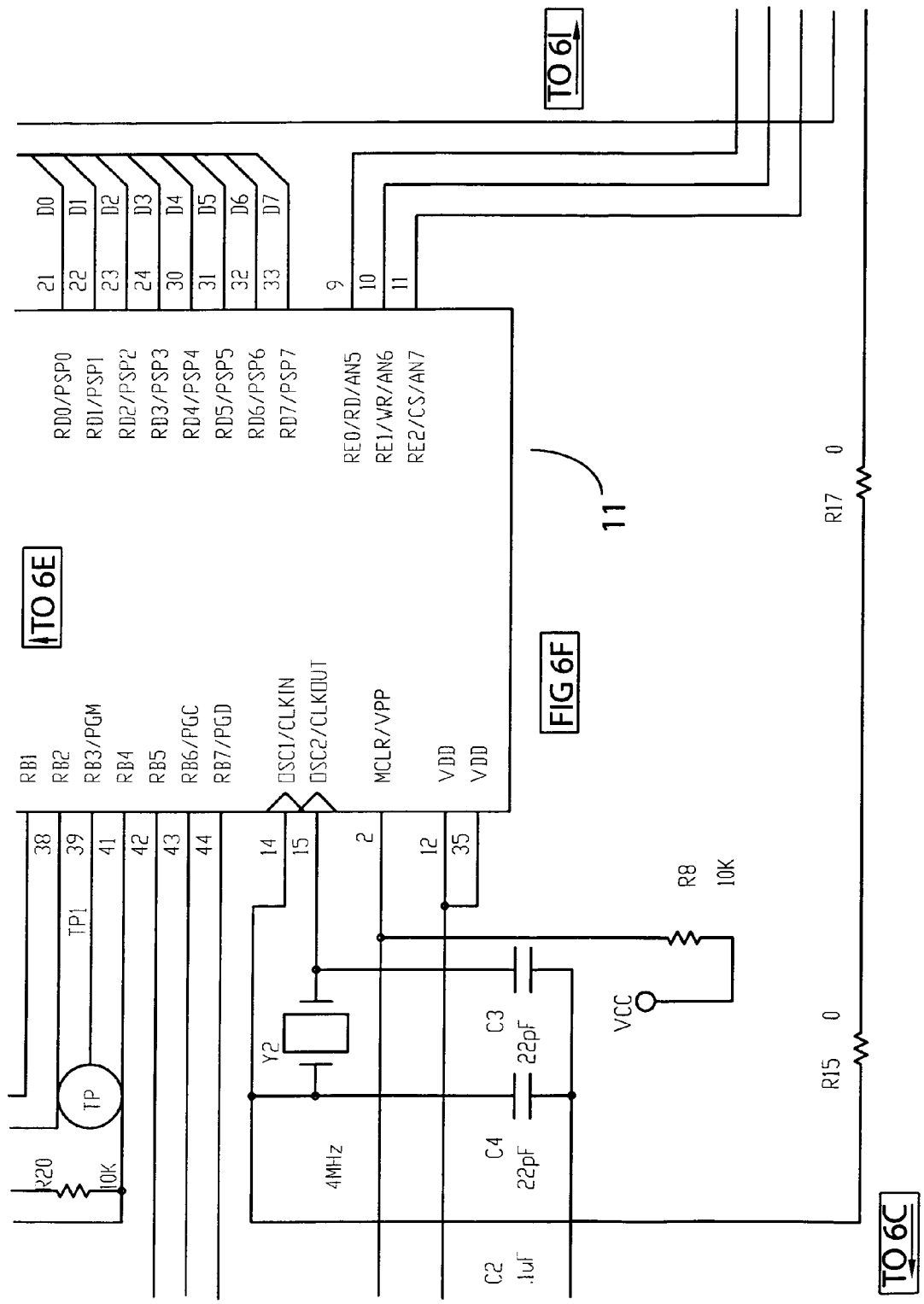

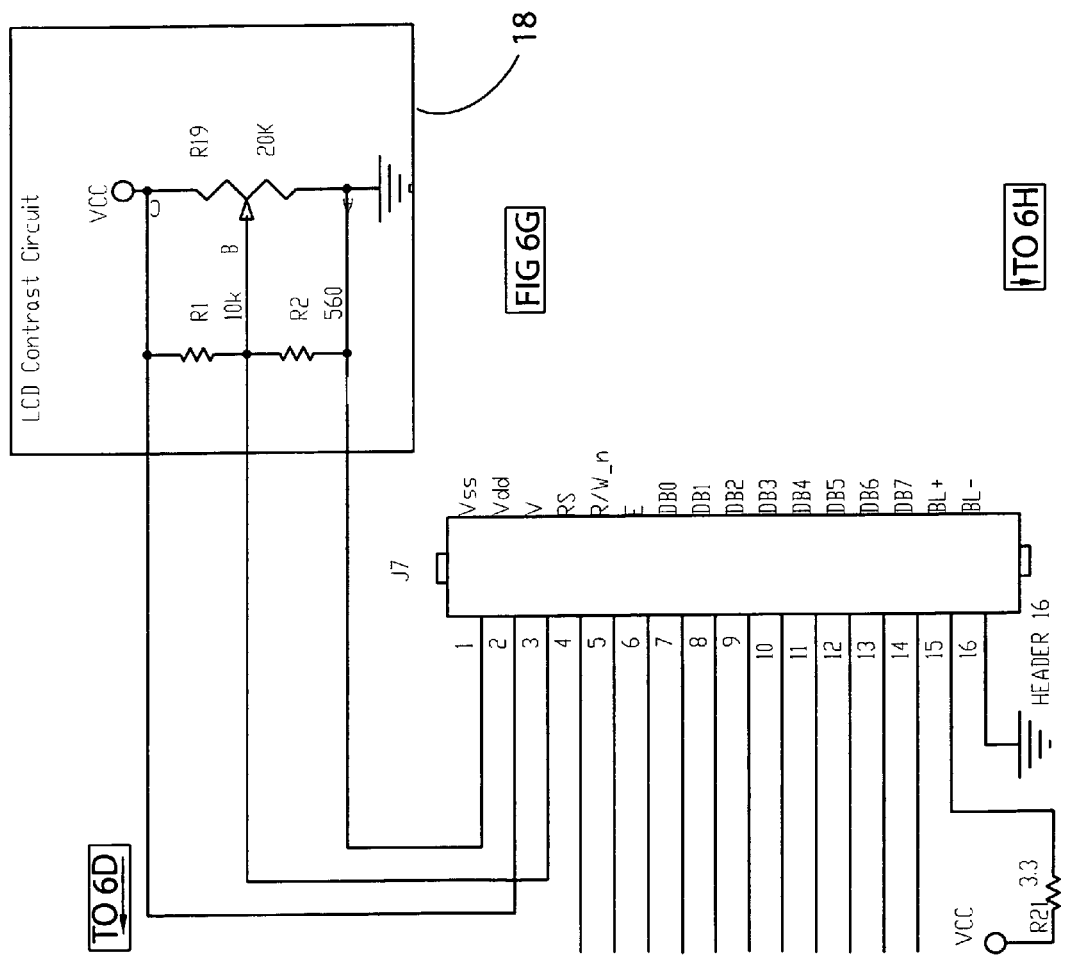

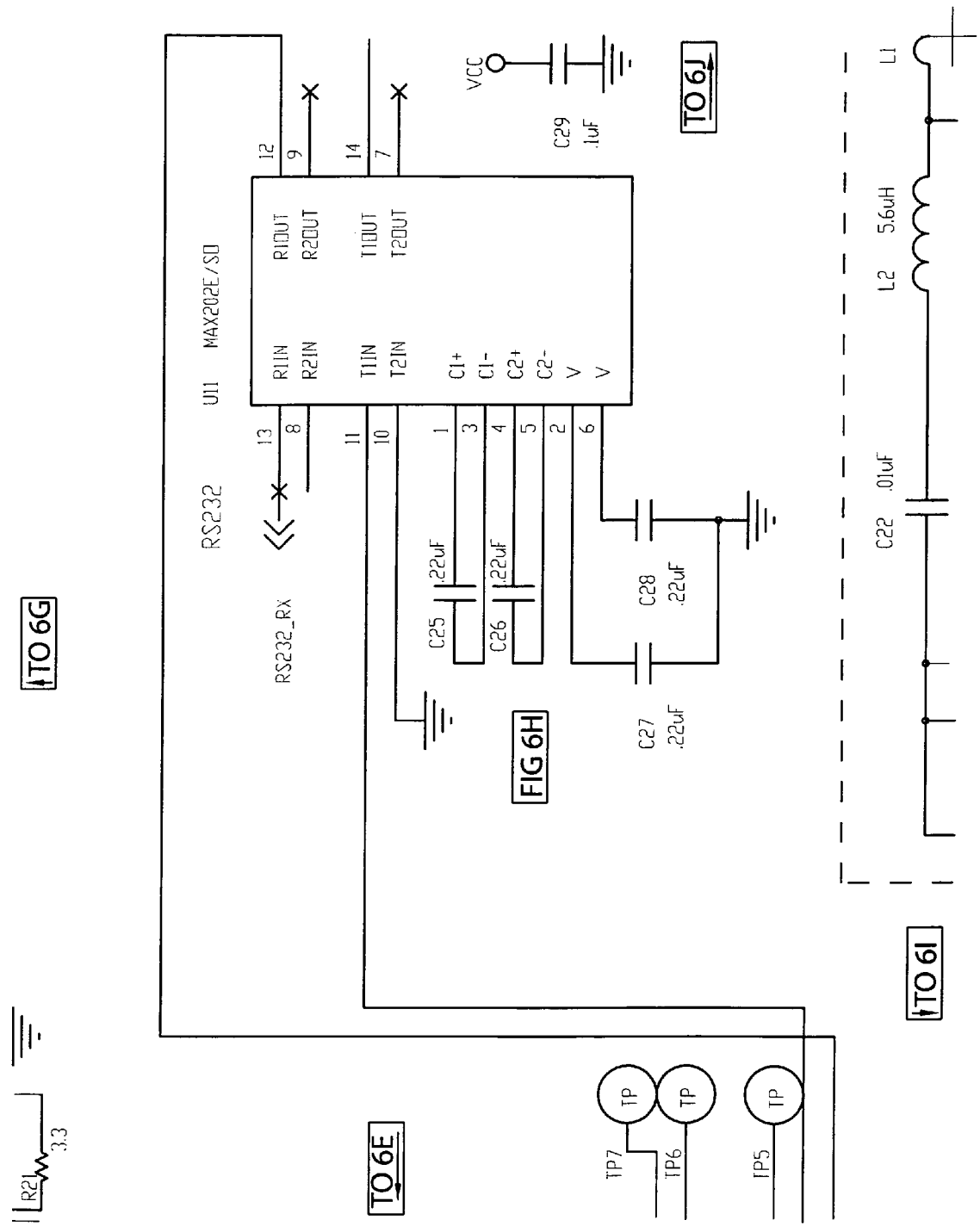

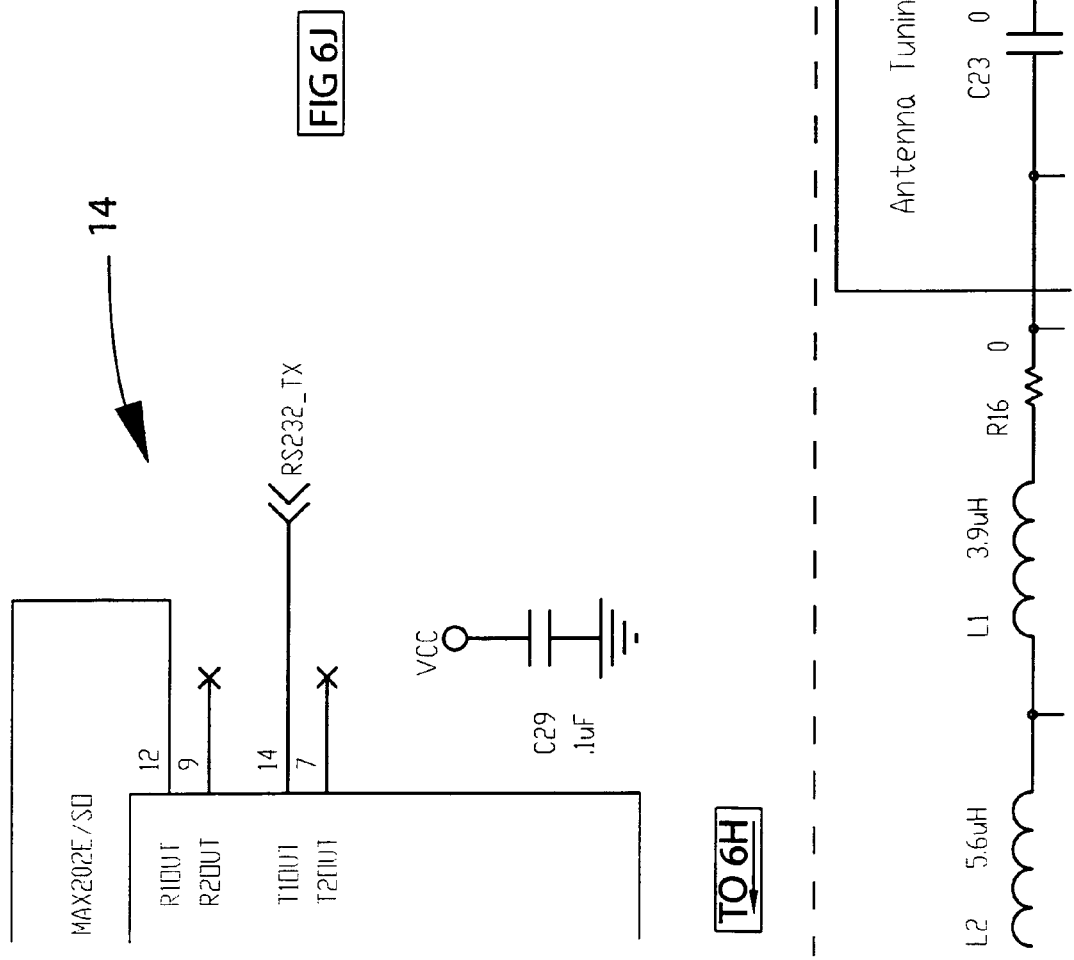

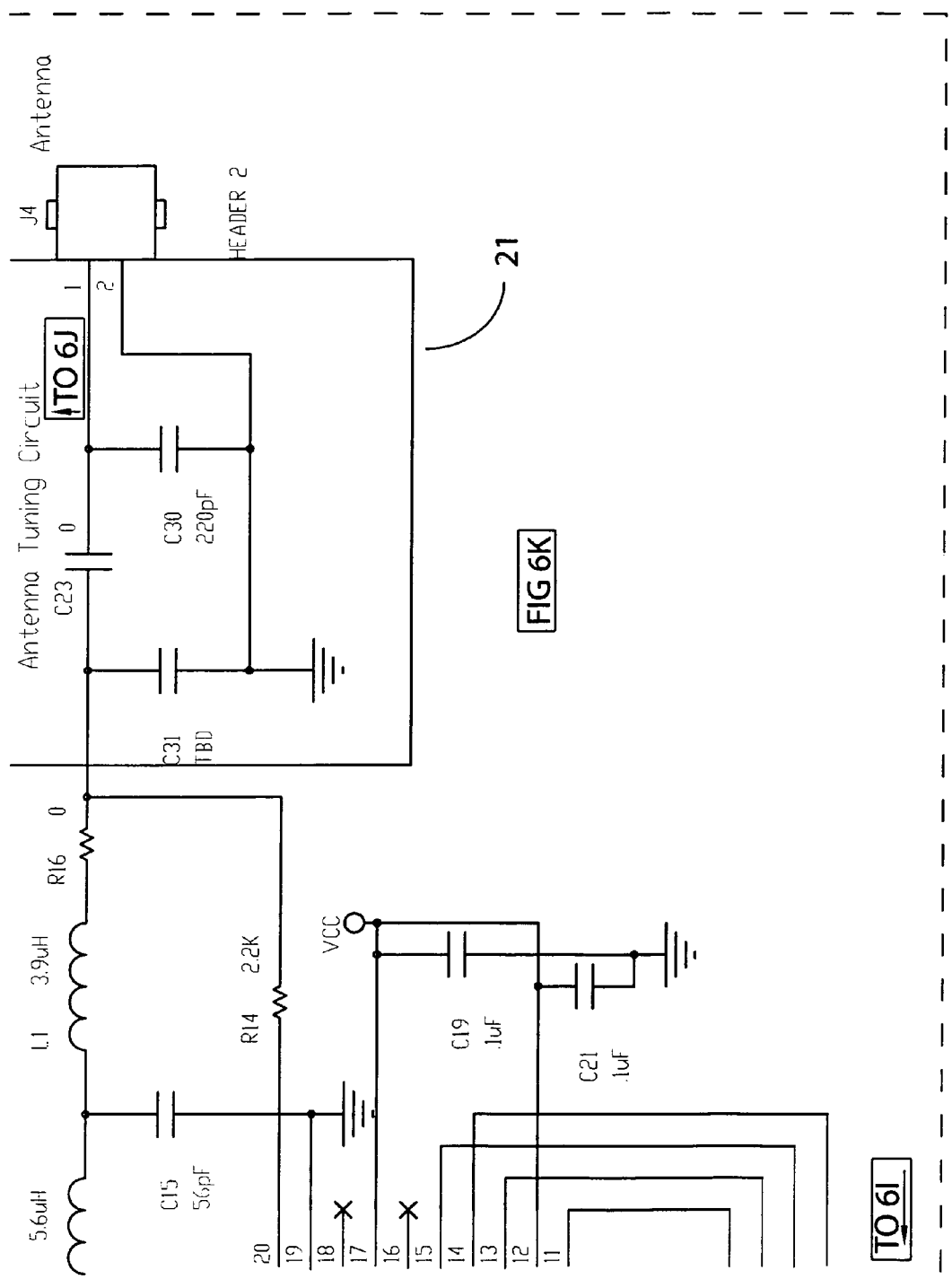

THIS IS WHAT DISPLAYS WHEN THE SYSTEM IS POWERED ON WITHOUT A FILTER

```
BUFFALO FILTER

INSERT VIROSAFE
    FILTER
```

THIS APPEARS FOR A FEW SECONDS AFTER THE FILTER IS INSERTED THEN MOVES TO THE "FILTER LIFE REMAINING" SCREENS

```
BUFFALO FILTER

INSERT VIROSAFE
    FILTER
```

THESE SCREENS WILL DISPLAY FILTER TYPE, TIME REMAINING, SUCTION TYPE AND PERCENTAGE POWER

```
Virosafe  - OH         HR-MN
Time Remaining         21-31
Suction Setting           0%
Mode - NORMAL      Motor-Off
```

"REPLACE FILTER" FLASHES AT LESS THAN 30 MINUTES.

```
Virosafe  - OH         HR-MN
Time Remaining         21-31
Suction Setting           0%
Mode - NORMAL      Motor-Off
```

THIS IS WHAT THE SCREEN LOOKS LIKE WHEN THE FILTER NEEDS TO BE REPLACED.

```
Virosafe  - OH         HR-MN
REPLACE FILTER         00-00
Suction Setting           0%
Mode - NORMAL       Motor-ON
```

THIS IS WHAT THE SCREEN DISPLAYS WHEN A "KNOCK-OFF" FILTER IS INSERTED

```
REPLACE FILTER
    WITH A
GENUINE VIROSAFE
    FILTER
```

SPECIFICATION SCREENS

```
Filter Lot #       XXXXXXX
MFG. Date       MM/DD/YYYY
Over Run             XXXX
Reset Via CARD        YES
```

SPECIFICATION SCREENS

```
BRUSH HOURS =    500
IF OVER 500 HRS CALL
    1-800-343-2324
    1-716-835-7000
```

SPECIFICATION SCREENS

```
FILTER I.D. ERROR!
CALL FOR SERVICE
   1-800-343-2324
   1-716-835-7000
```

Fig. 7

FLUID EVACUATION SYSTEM WITH TWO-WAY COMMUNICATION FILTER

This application claims priority to U.S. Provisional Application Ser. No. 60/668,126 filed Apr. 4, 2005.

BRIEF DESCRIPTION OF THE DRAWINGS

FIG. 2 is a schematic drawing of one embodiment of a read/write circuit functionally connected to a filter;

FIG. 3 is a schematic drawing of another embodiment of a read/write circuit functionally connected to a filter;

DETAILED DESCRIPTION OF EMBODIMENTS OF THE INVENTION

Initially, it should be appreciated that like drawing numbers on different drawing views identify identical structural elements. It also should be appreciated that figure proportions and angles are not always to scale. Further, it should be understood that the evacuation system is not limited to the disclosed embodiments. Various modifications and equivalent arrangements may be included within the spirit and scope of the appended claims.

Figure 1:
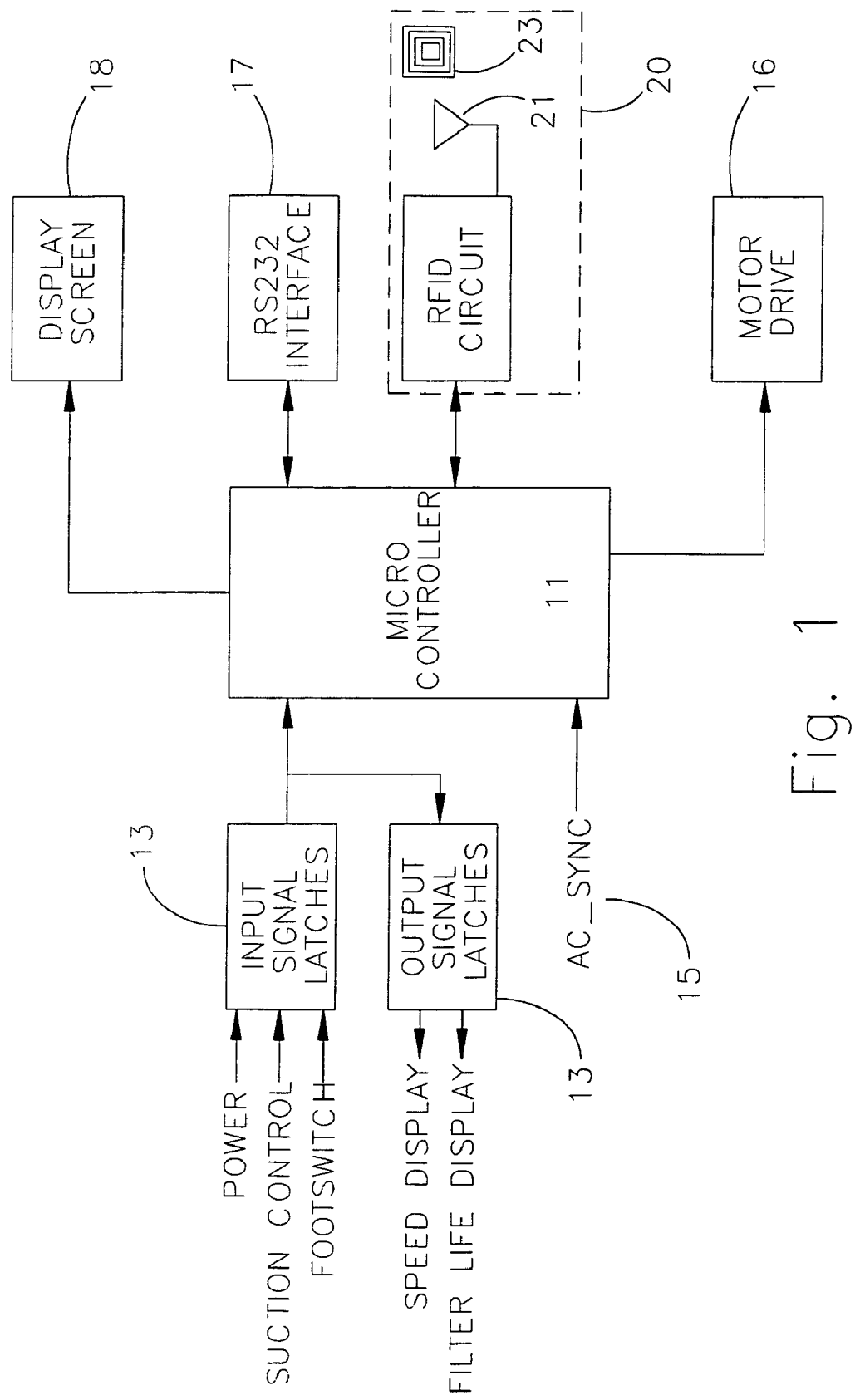
FIG. 1 is a schematic drawing of components of an embodiment of an evacuation system connected to the microcontroller.
Figure 4:
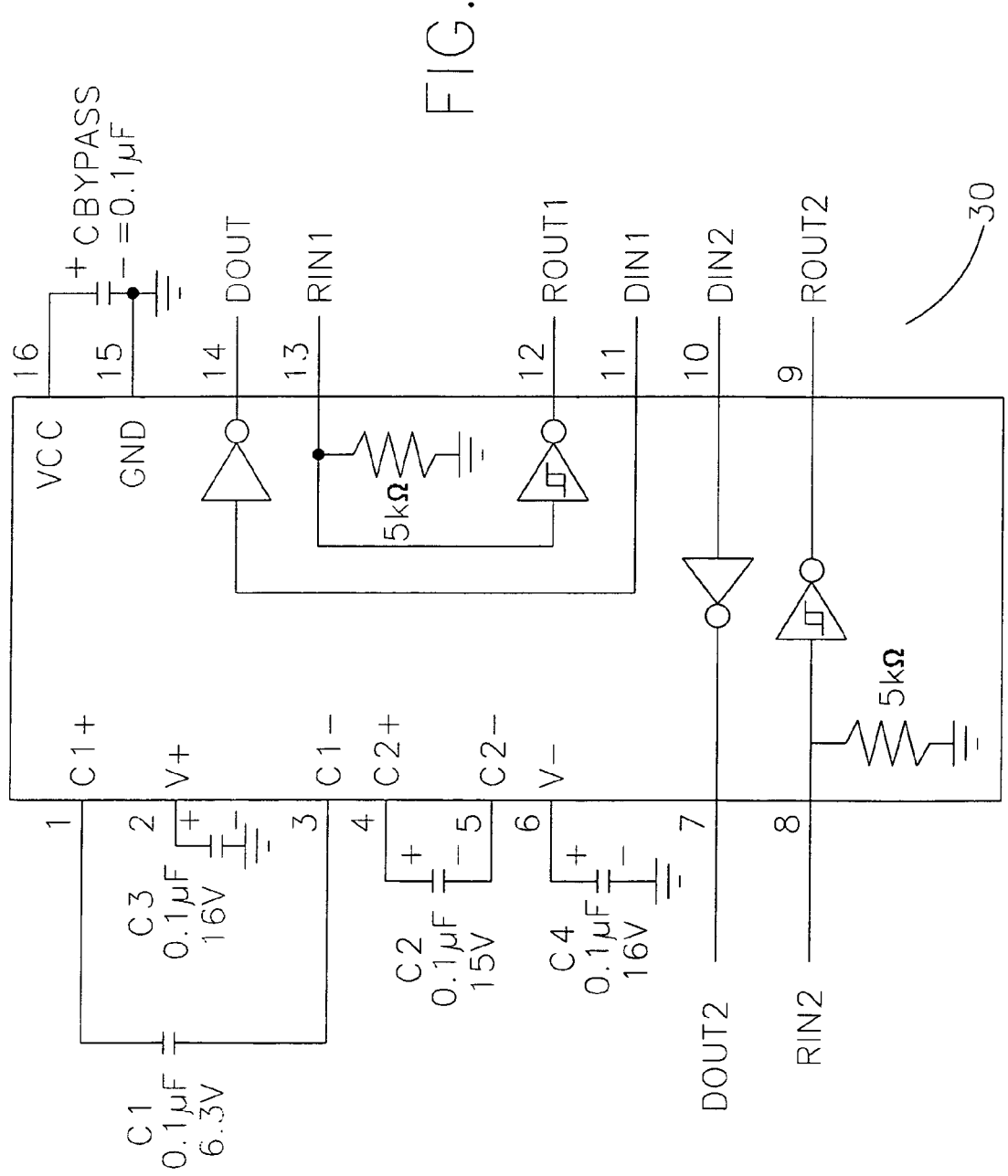
FIG. 4 is a circuit diagram of a RS-232 communication circuit of an evacuation system.
Figure 5:
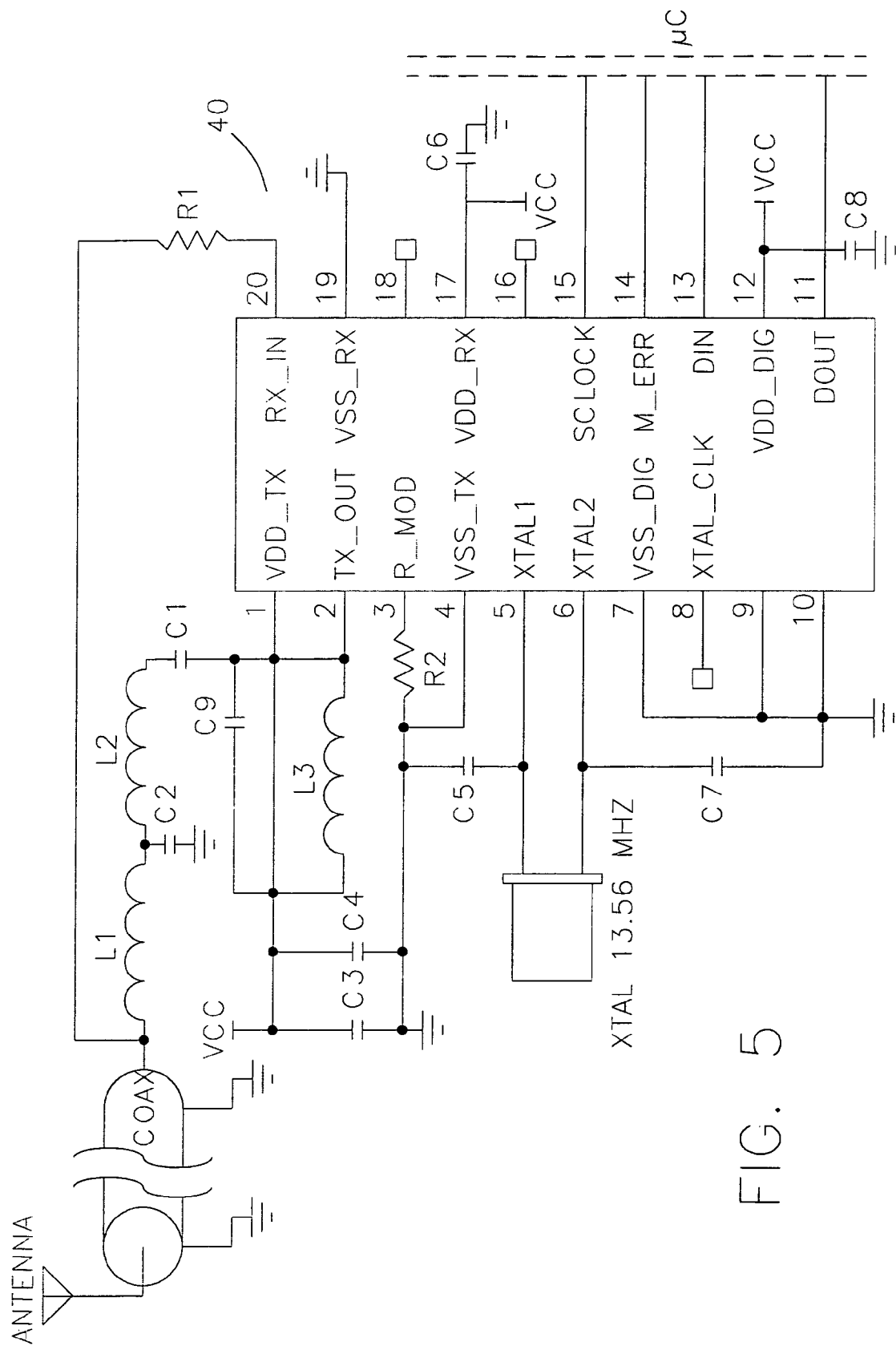
FIG. 5 is a circuit diagram of a two way read/write circuit connected to a microcontroller of an evacuation system.

Referring to the drawings, FIG. 1 is a partial schematic drawing of an evacuation system 10 for evacuating suspended particulates from a fluid stream. It should be understood that the fluid stream may be comprised of liquids, gases, and/or solids. Further, the suspended particles may be visible or microscopic particles; organic or inorganic matter. In one embodiment, the suspended particles in a fluid stream are in the form of smoke. Evacuation system 10 includes at least one fluid intake, at least one exhaust outlet and an evacuation motor unit (not shown). As shown, a microcontroller 11 is in functional communication with components of evacuation system 10 such as input signal latches 13, output signal latches 14, an alternate circuit (A/C) synchronization system 15, a motor drive 16 and a remote switch interface 17. Microcontroller 11 is also in functional communication with a display screen 18. In addition, microcontroller 11 is functionally connected to a two-way read/write circuit 20. In the embodiment shown in FIG. 1, read/write circuit 20 includes an antenna 21 which may be present if read/write circuit 20 is a radio frequency identification tag ("RFID") reader/writer. The read/write circuit 20 may be based on the ISO 15693 standard for communicating with tags at 13.56 MHz. Further, the interface between microcontroller 11 and read/write circuit 20 may include a 3-wire serial interface having a bi-directional clock controlled by microcontroller 11 during command/data write operations and by read/write circuit 20 during data read operations. In one embodiment, evacuation system 10 includes a control panel (not shown). The control panel and display screen 18 may combined into one integral component. In another embodiment, evacuation system 10 is in functional communication with a filter 22 which includes a second two-way read/write circuit such as RFID tag 23.

A suitable read/write circuit component is the TI S6700 ASIC from Texas Instruments or similarly equivalent devices. In an alternate embodiment, read/write circuit 20 may include a direct-wired connection between microcontroller 11 and a downstream component, such as filter 22.

Microcontroller 11 contains at least one program configured to control the functionally connected components as well as, when necessary, determining changes in functional or operational parameters of the functionally connected components. As used herein the phrase "functionally connected" shall mean that components, for example, microcontroller 11 and read/write circuit 20, are connected in such a way that signals, data, controls and other applicable modes of information are transmitted therebetween using either suitable direct wired connections or a form of wireless or radio transmission and reception. In one embodiment, in which read/write circuit 20 is an RFID tag reader/writer, an antenna is used to functionally communicate with an RFID tag on another component. Microcontroller 11 may include an external electrically erasable programmable read-only memory (EEPROM) to hold the required programs. An internal EEPROM may be used as it requires fewer I/O pins and makes available more memory. In an alternate embodiment, microcontroller 11 may be in functional communication with a data port, such as a USB connection, to allow changes or replacement of a program.

In another alternate embodiment, read/write circuit 20 and read/write circuit of filter 22 may transfer information using short-distance radio communication. According to this kind of radio communication method, cordless communication between equipment and a terminal can be established. For example, short-distance radio communication can be used for the following: data exchange between pieces of portable information equipment; and transmission of data and sound between a main body of a telephone (or a portable music player) and a headset, between a main phone and a cordless handset, and between others. One representative type of short-distance radio communication is Bluetooth.

FIGS. 2 and 3 illustrate schematically two configurations of read/write circuit 20 functionally connected to filter 22 and RFID tag 23. In FIG. 2, antenna 21 is arranged such that the planes formed by antenna 21 and RFID tag 23 are parallel to each other. Although this configuration allows for two-way communication between distances of up to 8 inches, the presence of metal or other conductive material between antenna 21 and tag 23 interferes with communication between the two components.

FIG. 3 illustrates an orientation in which antenna 21 is looped around a filter housing (not shown) in a substantially perpendicular orientation in relation to tag 23. While this orientation reduces effective communication range, it allows for designs such that tag 23 is about 0.5 inch from at least a part of antenna 21. As shown in FIG. 2, antenna 21 is arranged parallel to at least a part of tag 23. Suitable RFID tags include the TI-IT HF-I transponder family of tags from Texas Instruments. Persons of ordinary skill in the art will recognize the more than one RFID tag 23 may be used with filter 22. Also, the two-way read/write circuit of filter 22, such as RFID tag 23, can be used to transmit command and control instructions to microcontroller 11.

FIG. 7 is a collection of screen shots presented on display screen 18, such as an LCD screen, to inform the system user of various operational or structural parameters or data including, but not limited to, type of filter used, filter life remaining, filter life consumed, evacuation motor suction setting, filter lot number, filter manufacturing date, authentication code(s), evacuation motor brush life, and an error message. It will be obvious to those skilled in the art that other messages, including set up parameters such as off/standby/on message(s), flow rate and/or motor speed, mode selection, and filter overuse (use past rated filter life) may be displayed on the display screen. An authentication code (for example, to allow or disallow operation of the evacuation system), first written into a filter read/write circuit, may be transmitted to microcontroller 11 to command that a certain flow rate or flow rate range be used for that filter. It will be recognized that the functional communication between RFID tag 23 of filter 22 and microcontroller 11 through read/write circuit 20 enables the above operation and/or structural parameters to be transmitted to and from filter 22 and microcontroller 11.

Typically, display screen 18 may be mounted on a evacuation boom in an easily visible position such as that disclosed in U.S. Pat. No. 6,524,307 to Palmerton, et al. Alternatively, display screen 18 may be detached and mounted on a wall, in a separate control room, operating room or on a stand-alone evacuation unit that intakes air to filter smoke and/or particulate matter and evacuates it back into a room. In one embodiment, display screen 18 is integral with an evacuation system control panel.

Figure 6E:
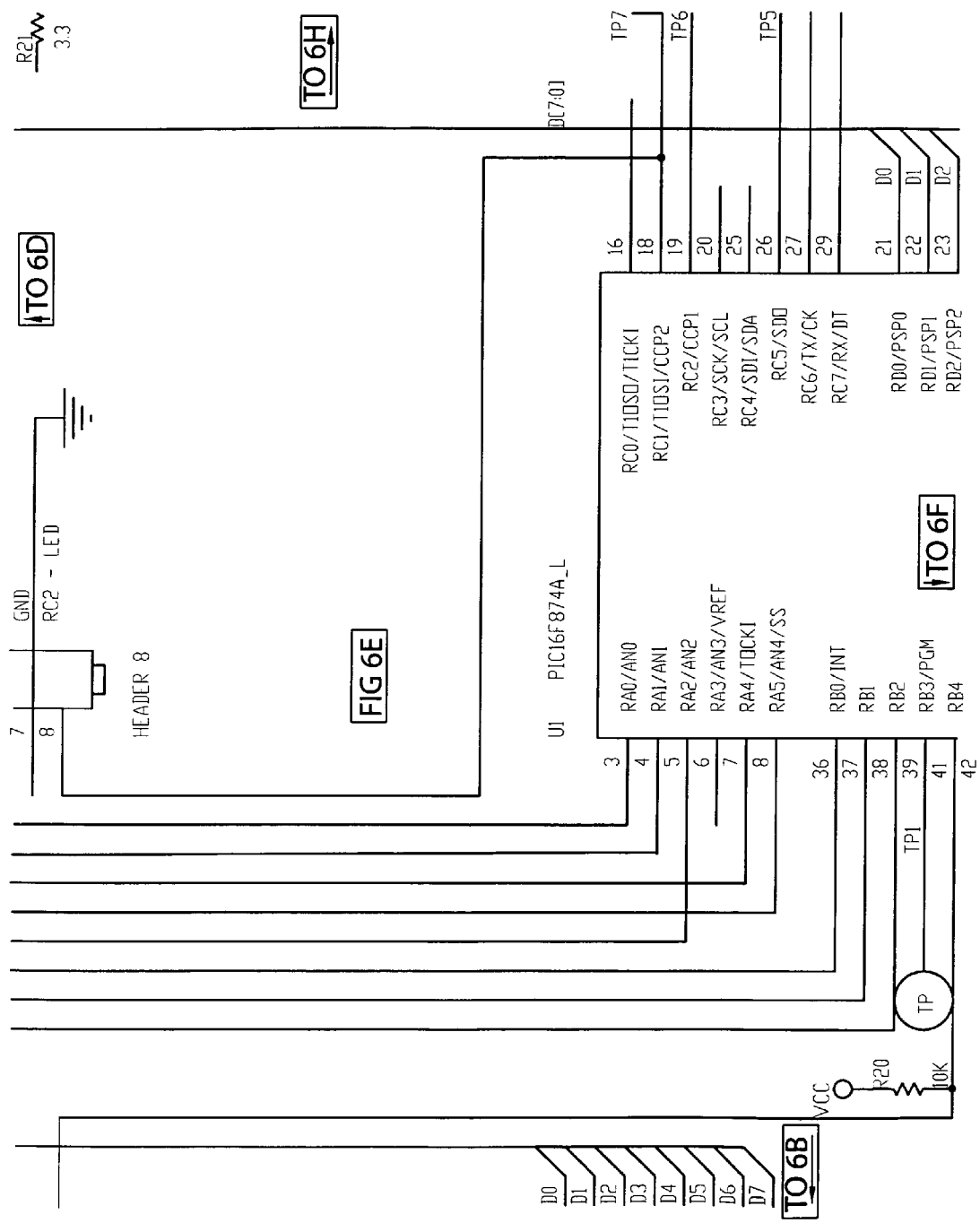
FIG. 6 is a circuit diagram showing a display panel and a two-way read/write circuit connected to a microcontroller of an evacuation system; and, FIG. 7 illustrates screen shots displayed on a display panel of an evacuation system.
Figure 6I:
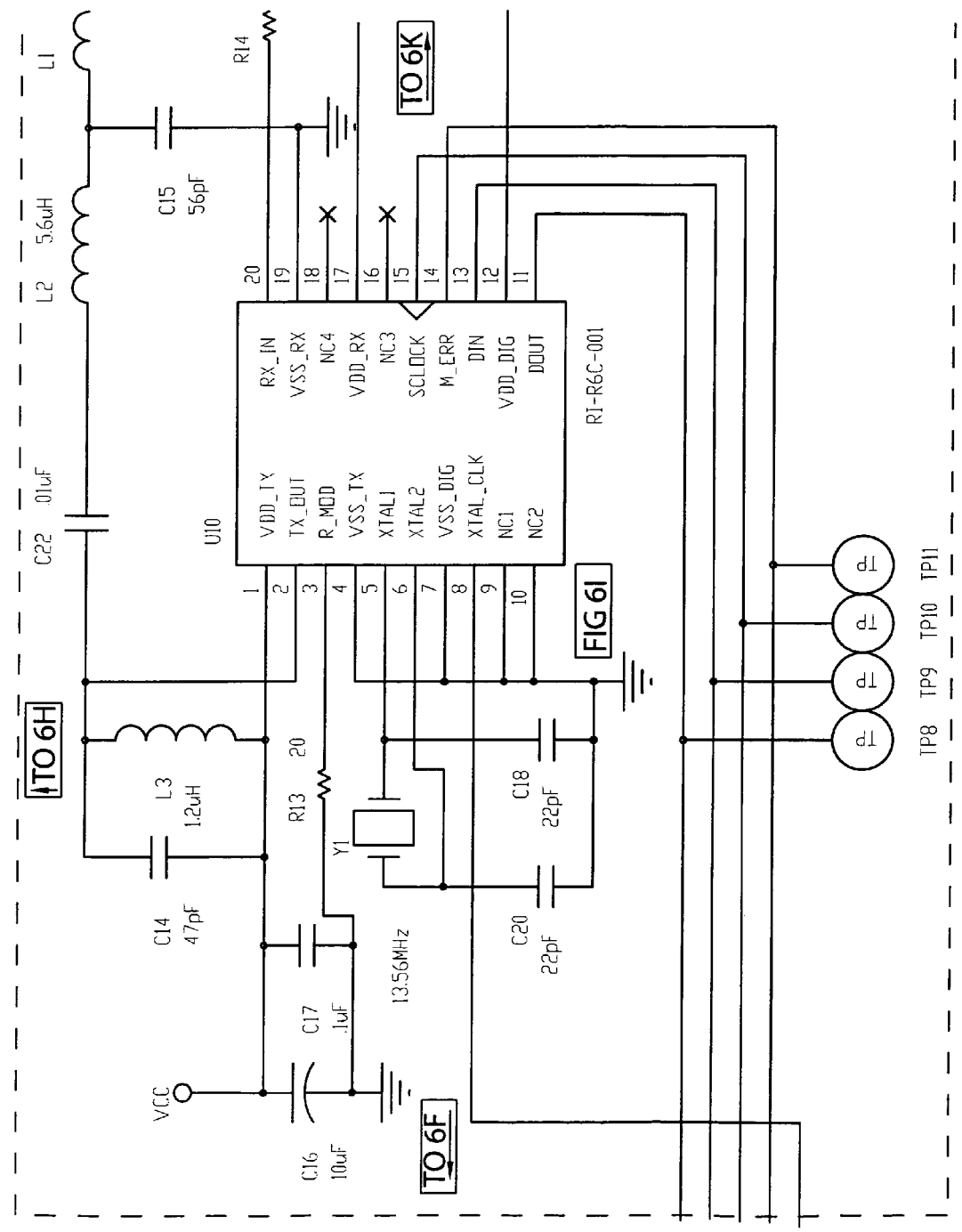

FIG. 6 is a circuit diagram showing several of the circuits leading from microcontroller 11. Read/write circuit 20 is shown to include antenna 21. Display screen 18 is also shown connected to microcontroller 11.

Typically, microcontroller 11 contains programming to calculate and display the remaining filter life. The established or rated filter life is written into RFID tag 23, along with such information as filter type or name, manufacturer, and manufacturing lot number. When a new filter is inserted into the evacuation system, microcontroller 11 reads and stores this information through read/write circuit 20 after powering RFID tag 23 through antenna 21 of read/write circuit 20. Some or all the information is displayed as seen in the screen shots of FIG. 7. Displayed calculations such as remaining filter life may be based on a simple calculation loop. Established filter life may be based on a particular evacuation motor speed or intake flow rate which is a function of evacuation motor speed. At a preset time interval, the motor speed or flow rate is sensed or calculated and recorded by the program in microcontroller 11. In the same operation, the number of minutes or seconds is subtracted from the rated filter life. Thus, if a filter life for a particular filter is rated at 10 hours (600 minutes), after one minute of operation, remaining filter life would be 559 minutes. In one embodiment, this calculation may be adjusted by the actual flow rate. Thus, if the flow rate used to establish the rated filter life is 10 CFM, a flow rate of 5 CFM would increase filter life to 20 hours which would be calculated and stored in microcontroller 11 memory and displayed. Similarly, if the actual flow rate is 20 CFM, the actual filter life would be 300 minutes (5 hours). In one embodiment, if an evacuation system is operated at different flow rates, the displayed remaining filter life is based on the current operating flow rate.

In an alternate embodiment, filter life may be based on time of use. In this embodiment, microcontroller 11 and/or RFID tag 23 may include a clock or timer function to determine the length of time of filter use.

Each recorded change in filter life is also transmitted through read/write circuit 20 to RFID tag 23 where it may be saved. Consequently, if filter 22 is moved from one evacuation unit to another compatible unit, that second unit would read the remaining filter life on the transferred filter. Remaining filter life may be displayed in several ways, including but not limited to, a percentage of rated filter life, actual remaining filter life, and consumed filter life. Similarly, diagnostic parameters, such as motor brush life and filter history, may be calculated and displayed using similar calculations.

The microcontroller 11 and/or RFID tag 23 may also include a reset feature in which an evacuation system is powered into a standby or operational mode but no smoke or other particulates are actually evacuated through filter 22. In such a situation, a recorded filter life may be reset to the full rated life. Other possible displays include but are not limited to, error messages indicating filter or diagnostic errors, authentication codes, filter history, evacuation flow rate, suction speed, and/or motor speed. Some or all of these operational and structural parameters may be transmitted and saved onto RFID tag 23 or equivalent components.

In one embodiment, RFID tag 23 of filter 22 contains control information that when transmitted to microcontroller 11, details particular operational parameters to be enabled. For example, certain filters 22 may be designed for certain flow rates. Commands transmitted from RFID tag 23 may then be transmitted to microcontroller 11 to operate the evacuation motor at those specific flow rates or within a certain flow rate range.

Up to this point, the evacuation system was described in detail with reference to specific embodiments. The described embodiments were presented in the form of exemplification and should not be interpreted in a limited manner. Changes and modifications to these embodiments should be readily apparent to those having ordinary skill in the art.

We claim:

1. A method for controlling a system for evacuating suspended particulates from a fluid having at least one fluid intake, at least one fluid outlet, a first read/write device, and a controller coupled to said first read/write device, said method comprising:
    inserting a filter into said evacuation system, said filter including a RFID tag having filter life information stored thereon;
    transmitting said filter life information from said RFID tag to said first read/write device;
    measuring the flow into said filter;
    determining remaining filter life information with said controller as a function of said flow; and
    displaying said remaining filter life information on a display screen coupled to said controller;
    wherein said filter life information is adjusted as a function of evacuation motor flow rate.

2. A system for evacuating suspended particulates from a fluid comprising:
    at least one fluid intake;
    at least one fluid outlet;
    an evacuation motor having an evacuation motor speed;
    a RFID tag reader/writer;
    a filter having a RFID tag attached thereto for transmitting flow information to said RFID tag reader/writer, said flow information determined as a function of said evacuation motor speed;
    a microcontroller in functional communication with said RFID tag reader/writer and said evacuation motor, wherein said microcontroller interprets said flow information received by said RFID tag reader/writer, and said microcontroller controls said evacuation motor based on said interpreted flow information.

3. The evacuation system of claim 2 further comprising a display screen coupled to said microcontroller for displaying said information.

4. A system for evacuating suspended particulates from a fluid generated in connection with a medical procedure, comprising:
- at least one fluid intake;
- at least one fluid outlet;
- an evacuation motor for transferring fluid from said at least one fluid intake to said at least one fluid outlet;
- a filter having a RFID tag;
- a RFID tag reader/writer for transmitting, receiving and storing information regarding characteristics of said filter, said RFID tag reader/writer in functional communication with said RFID tag;
- a display for displaying said information;
- a microcontroller for determining said characteristics of said filter, said microcontroller in functional communication with said RFID reader/writer and said display, said microcontroller adapted to control at least one operational parameter of said evacuation motor as a function of one or more of said characteristics of said filter.

5. The evacuation system of claim 4 wherein said filter characteristic is filter life.

6. The evacuation system of claim 4 wherein said filter characteristic is remaining filter life.

7. The evacuation system of claim 4 wherein said filter characteristic is consumed filter life.

8. The evacuation system of claim 4 wherein said at least one operational parameter is evacuation motor speed.

9. The evacuation system of claim 4 wherein said at least one operational parameter is evacuation motor flow rate.

10. A system for evacuating suspended particulates from a fluid comprising:
- an evacuation motor;
- a first read/write device for transmitting, receiving and storing information;
- a filter having a RFID tag attached thereto, said RFID tag adapted to transmit and receive filter type information to said first read/write device;
- an authentication code designating a filter type, said authentication code written to said first read/write device;
- a microcontroller in functional communication with said first read/write device and said evacuation motor, wherein said microcontroller compares said authentication code with said filter type information, and said microcontroller operates said evacuation motor if said authentication code and said filter type information are equivalent.

11. A method for controlling a system for evacuating suspended particulates from a fluid having at least one fluid intake, at least one fluid outlet, a first read/write device, and a controller coupled to said first read/write device, said method comprising:
- inserting a filter into said evacuation system, said filter including a RFID tag having filter life information stored thereon;
- transmitting said filter life information from said RFID tag to said first read/write device;
- measuring the flow into said filter;
- determining remaining filter life information with said controller as a function of said flow;
- displaying said remaining filter life information on a display screen coupled to said controller; and
- controlling an evacuation motor as a function of said filter life information.

12. A method for controlling a system for evacuating suspended particulates from a fluid having at least one fluid intake, at least one fluid outlet, a first read/write device, and a controller coupled to said first read/write device, said method comprising:
- inserting a filter into said evacuation system, said filter including a RFID tag having filter life information stored thereon and having filter type information stored thereon;
- transmitting said filter life information from said RFID tag to said first read/write device;
- measuring the flow into said filter;
- determining remaining filter life information with said controller as a function of said flow;
- displaying said remaining filter life information on a display screen coupled to said controller;
- determining filter type;
- writing said filter type to said RFID tag;
- displaying said filter type on said display screen; and
- controlling an evacuation motor as a function of said filter type.

* * * * *